United States Patent [19]

Dlubak

[11] Patent Number: 4,642,255

[45] Date of Patent: Feb. 10, 1987

[54] LAMINATED ARTICLE AND PROCESS FOR MAKING SAME

[75] Inventor: Frank C. Dlubak, 104 Sipes Rd., Freeport, Pa. 16229

[73] Assignee: Frank C. Dlubak, Freeport, Pa.

[21] Appl. No.: 687,169

[22] Filed: Dec. 20, 1984

[51] Int. Cl.$^4$ .................. B32B 17/12; B32B 31/20; B44F 1/06; C03C 27/12

[52] U.S. Cl. ..................... 428/38; 156/99; 156/100; 156/103; 156/104; 156/105; 428/196; 428/200; 428/203

[58] Field of Search ............... 428/38, 196, 200, 203; 156/99, 100, 103, 104, 105

[56] References Cited

U.S. PATENT DOCUMENTS

| | | | |
|---|---|---|---|
| 1,187,346 | 6/1916 | Lea | 428/38 |
| 2,040,863 | 5/1936 | MacDonald et al. | 428/196 |
| 2,943,964 | 7/1960 | Goldenberg | 428/38 |
| 3,451,877 | 6/1969 | Herschman | 428/203 |
| 3,558,422 | 1/1971 | Hamilton et al. | 156/99 |
| 3,616,122 | 10/1971 | Orcutt | 428/38 |
| 3,740,281 | 6/1973 | Fujiwara | 156/99 |
| 3,922,456 | 11/1975 | Baldridge | 428/203 |
| 3,953,630 | 4/1976 | Roberts et al. | 428/38 |
| 4,173,672 | 11/1979 | Mannheim | 428/203 |
| 4,244,997 | 1/1981 | Postupock | 428/203 |
| 4,415,614 | 11/1983 | von Loewis | 428/38 |
| 4,433,016 | 2/1984 | Neely et al. | 156/99 |

FOREIGN PATENT DOCUMENTS

| | | |
|---|---|---|
| 748502 | 9/1970 | Belgium . |
| 2409868 | 7/1979 | France . |
| 156343 | 9/1982 | Japan . |

*Primary Examiner*—James C. Cannon
*Attorney, Agent, or Firm*—Joseph J. Carducci

[57] ABSTRACT

A laminated article comprising two outer glass layers, a polyvinyl acetal layer disposed therebetween and a fibrous layer encapsulated in said polyvinyl acetal layer; and a process for producing said laminated article comprising (1) maintaining a substantially constant vacuum in a flexible container containing an assembly comprising
   (a) a first glass layer,
   (b) a first polyvinyl acetal layer in contact with said first glass layer,
   (c) a fibrous layer in contact with said first polyvinyl acetal layer,
   (d) a second polyvinyl acetal layer in contact with said fibrous layer and
   (e) a second glass layer in contact with said second polyvinyl acetal layer;
(2) applying pressure on said container while increasing the same from about ambient pressure to an elevated pressure level and simultaneously increasing the temperature on the contents of said container from about ambient temperature to an elevated temperature level;
(3) reducing the temperature on the contents of said container from said elevated temperature level to about ambient temperature; and then
(4) reducing the pressure on said container from said elevated pressure level to about ambient pressure.

17 Claims, No Drawings

LAMINATED ARTICLE AND PROCESS FOR MAKING SAME

BACKGROUND OF THE INVENTION

1. Field of the Invention

This invention relates to (1) a laminated article comprising two outer glass layers, a polyvinyl acetal layer disposed therebetween and a fibrous layer encapsulated in said polyvinyl acetal layer and (2) a process for making said laminated article.

2. Information on Disclosure Statement

In the past, glass laminates have been prepared by sandwiching a sheet of plastic, such as polyvinyl butyral, between two sheets of glass. For this purpose clear sheets, as well as those having a black and white colored design, have been used. Generally, adherence of the layers of glass to the plastic sheet have been obtained by utilizing heat and pressure. However, there is a tendency for the plastic sheet to move during the preparation of the laminate, creating irregularities therein, and therefore producing visual distortion therein. Even under the best of conditions, all of the air is not removed between the interfacial surfaces of the adjacent layers of the assembly in the laminate, and the resultant air bubbles create additional visual distortion in the laminated product. herein, a glass laminate possessing decorative appeal is obtained but having none of the objectionable features described above.

SUMMARY OF THE INVENTION

My invention herein is (I) a novel laminated article comprising two outer glass layers, a polyvinyl acetal layer disposed therebetween and a fibrous layer encapsulated in said polyvinyl acetal layer; and (II) a novel process for producing said novel laminated article comprising (1) maintaining a substantially constant vacuum in a flexible container containing an assembly comprising (a) a first glass layer,
(b) a first polyvinyl acetal layer in contact with said first glass layer,
(c) a fibrous layer in contact with said first polyvinyl acetal layer,
(d) a second polyvinyl acetal layer in contact with said fibrous layer and
(e) a second glass layer in contact with said second polyvinyl acetal layer;

(2) applying pressure on said container while increasing the same from about ambient pressure to an elevated pressure level and simultaneously increasing the temperature on the contents of said container from about ambient temperature to an elevated temperature level;

(3) reducing the temperature on the contents of said container from said elevated temperature level to about ambient temperature; and then (4) reducing the pressure on said container from said elevated pressure level to about ambient pressure.

In preparing the novel laminated article defined and claimed herein, at least two sheets of glass, two sheets of a polyvinyl acetal and a fibrous sheet of material are needed. The first step required is to assemble the laminate. Generally, this is done by assembling the same in horizontal fashion: a first polyvinyl acetal layer is laid onto the surface of a first glass layer, a fibrous layer is laid onto the surface of said first polyvinyl acetal layer, a second polyvinyl acetal layer is then laid onto the surface of said fibrous layer and finally a second glass layer is laid onto the surface of said second polyvinyl acetal layer. In a preferred embodiment, prior to assembly, the surfaces of the glass layers that are to be in contact with the polyvinyl acetal layers are cleaned, for example, with a mild abrasive, such as pumice, followed by treatment with a cleanser, such as equal volumes of vinegar (acetic acid) and water. The fibrous sheet can be any porous fabric material, woven or unwoven, colored or uncolored, cloth with or without a design, made of any fiber, for example, of cotton, wool, nylon, glass, metal, such as iron, etc. In a preferred embodiment, the fibrous layer is maintained in a plane substantially parallel to the glass layers. If desired, the layers forming a part of the laminate can be either curved or can be maintained in a flat plane. The dimensions, length, width and thickness of each of the components of the laminate are not critical and can be within any of the ranges found normally in each of these components.

The laminate above defined is then placed in a sealed flexible or pliable bag or container provided with a tube that can be connected to a vacuum pump. The container can be made of any material that is flexible or pliable, such as polyurethane, nylon, etc. After the container has been sealed, it is placed in an autoclave, filled with any suitable fluid, such as air, the tube is connected to a vacuum pump and the autoclave is closed.

To remove air from the container, the vacuum pump is started and throughout the operation herein the vacuum in the container is maintained in the range of about 15 to about 25 inches of mercury, generally within the range of about 22 to about 24 inches of mercury. This completed, pressure is then applied on the container while simultaneously increasing the temperature on the contents of the container. The pressure will be raised from ambient pressure to about 110 to about 200 pounds per square inch gauge, or even higher, but generally will be in the range of about 120 to about 160 pounds per square inch gauge. The temperature will be raised from ambient temperature to a temperature in the range of about 270° to about 300° F., but preferably in the range of about 285° to about 295° F. The time utilized in raising the pressure and temperature from ambient conditions to the defined levels can be in the range of about 45 minutes to about two hours, or even higher, but generally will be in the range of about 60 to about 110 minutes. The contents of the container are maintained at the defined elevated pressure and temperature for about five to about 45 minutes, preferably about 25 to about 30 minutes.

After carrying out the above, and while maintaining the defined vacuum in the container and the defined pressure on the container, the temperature is reduced from the defined elevated level to ambient temperature. This reduction in temperature can take place over a period of about 15 to about 90 minutes, or even higher, but generally within about 60 to about 80 minutes. The pressure on the container is then released from the defined elevated level to ambient pressure. This reduction in pressure can take place over a period of about 30 to about 110 minutes, or even higher, but generally within about 75 to about 95 minutes. The vacuum within the container is then released, preferably simultaneously with the release of pressure on the container.

The laminate is then removed from the container and is now found to comprise two outer glass layers, a single, polyvinyl acetal layer disposed therebetween and a fibrous layer encapsulated in said polyvinyl acetal layer. As a result of the pressure and temperature imposed on the original five-layered laminate during the defined process, the polyvinyl acetal layers flow through the interstices of the fibrous layer and become a single, continuous, unitary phase, a polyvinyl acetal layer in which the fibrous layer is encapsulated. Since air was expelled from the container during the process, no air is found in the final laminate. The fibrous article being encapsulated in the single resulting polyvinyl acetal layer, no movement of the same in the final laminate is possible. When a decorative fibrous layer is used, the resultant laminate becomes a highly decorative article that will retain its original form.

DESCRIPTION OF PREFERRED EMBODIMENT

A laminate was prepared as follows.

A surface of each of two pieces of glass, each piece of glass having a length of 24 inches, a width of 24 inches and a thickness of ⅛-inch, was thoroughly rubbed with pumice. The pumiced area was then cleaned of remaining pumice with a solution containing equal volumes of vinegar and ammonia. The first lite of glass was mounted on a horizontal support with the clean surface facing upwardly and onto it was placed a polyvinyl butyral sheet having a length of 24½ inches, a width of 24½ inches, and a thickness of 1/64-inch, such that the polyvinyl butyral sheet extended ¼-inch beyond the edges of the glass. The polyvinyl butyral sheet was purposely made larger than the glass sheet to allow for any possible shrinkage thereof during the defined process herein. A woven lace cotton cloth having a length of 24¼ inches, a width of 24¼ inches and a thickness of 1/64-inch was similarly placed onto the polyvinyl butyral sheet. A second polyvinyl butyral sheet, having the same dimensions as the first, was similarly placed onto the woven lace cloth, and a second glass sheet, having the same dimensions as the first, was similarly placed onto the second polyvinyl butyral layer, with its clean surface facing the second polyvinyl butyral sheet.

The laminate so prepared was then placed in a flexible bag composed of polyurethane, and the bag positioned into an autoclave filled with air. The flexible bag was connected to a vacuum pump external to the autoclave. Immediately a vacuum was placed on the contents of the flexible bag to a level of 22 inches of mercury, and this vacuum was maintained during the operation, as described below.

The autoclave door was closed, and simultaneously, the temperature was raised from ambient temperature to 285° F. and the pressure from ambient pressure to 150 pounds per square inch gauge over a period of one hour. The contents of the bag were maintained at the above conditions of vacuum, pressure and temperature for 30 minutes, during which time the polyvinyl butyral in the two layers flowed through the interstices of the woven lace cloth, forming a single continuous phase of polyvinyl butyral in which the woven lace cloth became encapsulated or embedded.

At the end of 30 minutes, as defined above, the temperature was reduced over a period of one hour from 285° F. to ambient temperature. Ambient temperature having been reached, the pressure was released from 150 pounds per square inch gauge to ambient pressure over a period of one hour and 15 minutes. The doors of the autoclave were open and the vacuum in the bag was then released instantly. The finished laminate product was removed from the bag and was found to consist of the two outer glass layers, a single polyvinyl butyral layer disposed therebetween and the woven lace cloth encapsulated in the polyvinyl butyral layer, with the polyvinyl butyral being through the interstices of the woven lace cloth. There were no detectable air bubbles in the laminate, and the woven lace cloth remained positioned in the final laminate identical to the position it held during the initial assembly. The final laminate was an attractive decorative article having translucent properties.

Although, I have referred to "glass sheets" herein, it is understood that not only glass sheets composed of silica glass compositions can be used but also rigid plastic sheets composed of well-known substitutes for glass, such as polycarbonates, acrylics, polyurethanes, polyesters and the like. Similarly, while I have referred to polyvinyl acetals, preferably polyvinyl butyral, it is understood that any other material having similar physical characteristics in relation to glass and which will react similarly to polyvinyl acetals under the process conditions herein can be used in place thereof.

Obviously, many modifications and variations of the invention, as hereinabove set forth, can be made without departing from the spirit and scope thereof and, therefore, only such limitations should be imposed as are indicated in the appended claims.

I claim:

1. A decorative laminated article comprising two outer glass layers, a polyvinyl acetal layer disposed therebetween and a porous fibrous layer comprising fibrous material designed in a decorative pattern having interstices, said fibrous material disposed in a decorative pattern extending well within the peripheral edge of said laminated article, encapsulated in said polyvinyl acetal layer, said polyvinyl acetal layer extending through said interstices and constituting a single, continuous, unitary phase.

2. The laminated article of claim 1 wherein said polyvinyl acetal layer is a polyvinyl butyral layer.

3. The laminated article of claim 1 wherein said fibrous layer is a woven cloth.

4. The laminated article of claim 1 wherein said fibrous layer is substantially parallel to said glass layers.

5. A process for producing a decorative laminated article which comprises
   (1) maintaining a substantially constant vacuum in the range of about 15 to about 25 inches of mercury in a flexible container containing an assembly comprising
      (a) a first glass layer,
      (b) a first polyvinyl acetal layer in contact with said first glass layer,
      (c) a porous fibrous layer comprising fibrous material designed in a decorative pattern, having interstices therein, in contact with said first polyvinyl acetal layer, and disposed in a decorative pattern extending well within the peripheral edge of said first polyvinyl acetal layer,
      (d) a second polyvinyl acetal layer in contact with said fibrous layer and
      (e) a second glass layer in contact with said second polyvinyl acetal layer;
   (2) applying pressure on said container while increasing the same from about ambient pressure to an elevated pressure level in the range of about 110 to about 200 pounds per square inch gauge and simultaneously increasing the temperature in the contents of said container from about ambient temperature to an elevated temperature level in the range of about 270° to about 300° F. over a period of about 45 minutes to about two hours;

(3) maintaining the contents of said container at said elevated pressure and said elevated temperature for about five to about 45 minutes;

(4) reducing the temperature on the contents of said container from said elevated temperature level to about ambient temperature over a period of about 15 to about 90 minutes;

(5) reducing the pressure on said container from said elevated pressure level to about ambient pressure over a period of about 30 to about 110 minutes; and (6) releasing the vacuum within said container, whereby a decorative laminated article is obtained comprising two outer glass layers, a polyvinyl acetal layer disposed therebetween and a porous fibrous layer comprising fibrous material designed in a decorative pattern, having interstices, said fibrous material disposed in a decorative pattern extending well within the peripheral edge of said laminated article, encapsulated in said polyvinyl acetal layer, said polyvinyl acetal layer extending through said interstices and constituting a single, continuous, unitary phase.

6. The process of claim 5 wherein said vacuum is in the range of about 22 to about 24 inches of mercury.

7. The process of claim 5 wherein the surfaces of said glass layers in contact with the surfaces of said polyvinyl acetal layers have been cleaned prior to the formation of said assembly.

8. The process of claim 7 wherein said cleaning has been carried out using an abrasive.

9. The process of claim 5 wherein said elevated pressure level is in the range of about 120 to about 160 pounds per square inch gauge.

10. The process of claim 5 wherein said elevated temperature level is in the range of about 285° to about 295° F.

11. The process of claim 5 wherein the time required to raise the pressure and temperature from about ambient conditions to said elevated levels is in the range of about 60 to about 110 minutes.

12. The process of claim 5 wherein the contents of said container are maintained at said elevated pressure and said elevated temperature for about 25 to about 30 minutes.

13. The process of claim 5 wherein the time required to reduce the temperature from said elevated temperature level to about ambient temperature is in the range of about 60 to about 80 minutes.

14. The process of claim 5 wherein the time required to reduce the pressure from said elevated pressure level to about ambient pressure is in the range of about 75 to about 95 minutes.

15. The process of claim 5 wherein said vacuum is released while the pressure on said container is reduced from said elevated pressure level to about ambient pressure.

16. The process of claim 5 wherein said polyvinyl acetal layer is a polyvinyl butyral layer.

17. The process of claim 5 wherein said fibrous layer is a woven cloth.

* * * * *